Feb. 9, 1937.  J. N. ALEXANDER  2,070,106
GRAVITY FEED FOR CROSS-CUT SAW HANDLES
Filed Dec. 27, 1934  2 Sheets-Sheet 1
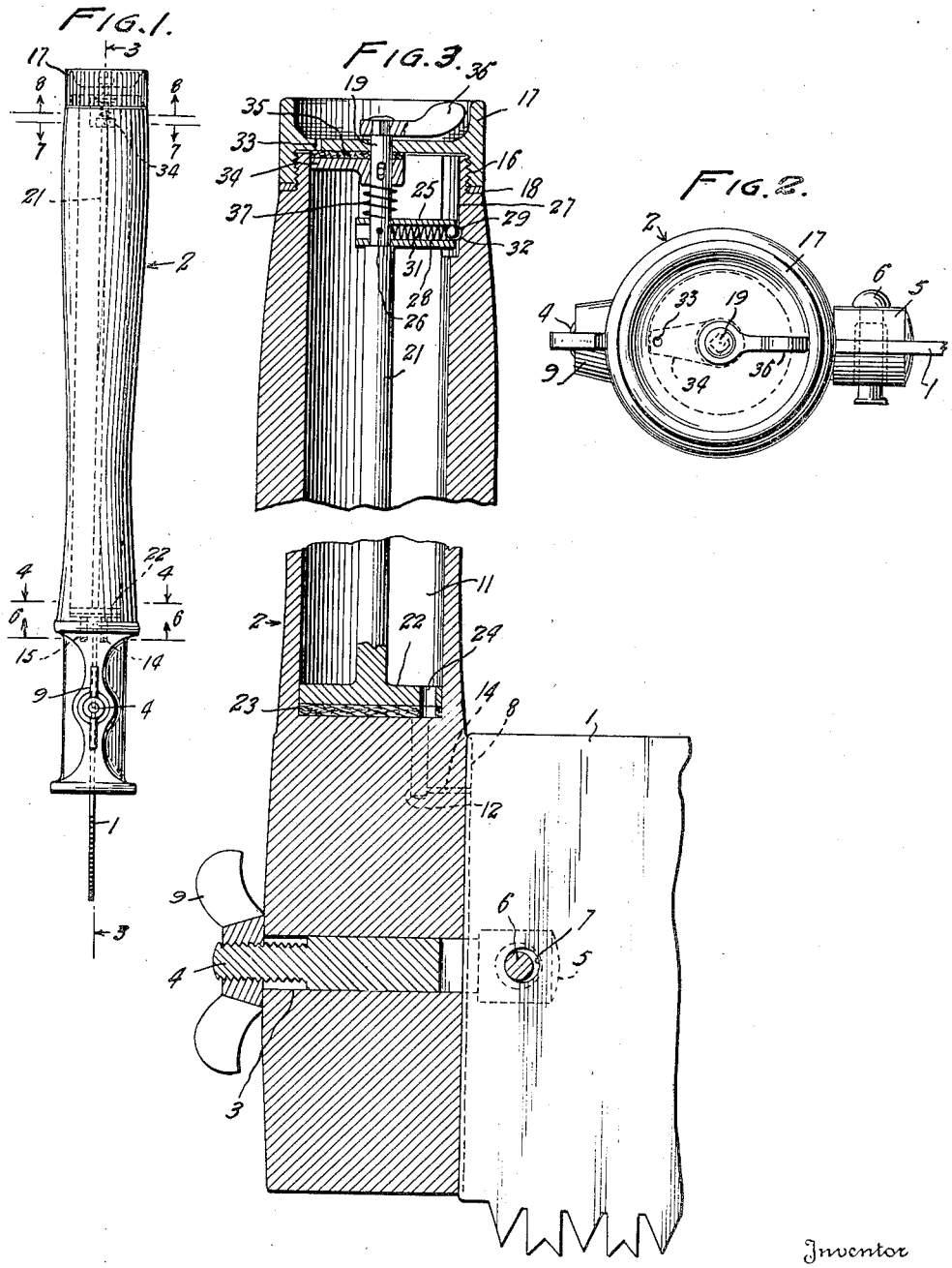
Inventor
JAMES N. ALEXANDER
By Semmes & Semmes
Attorneys

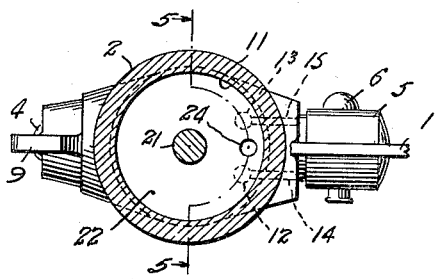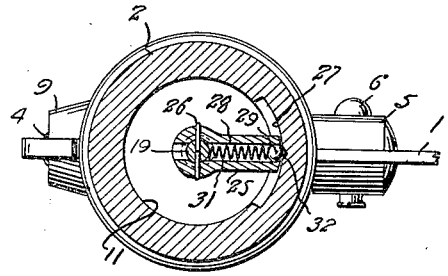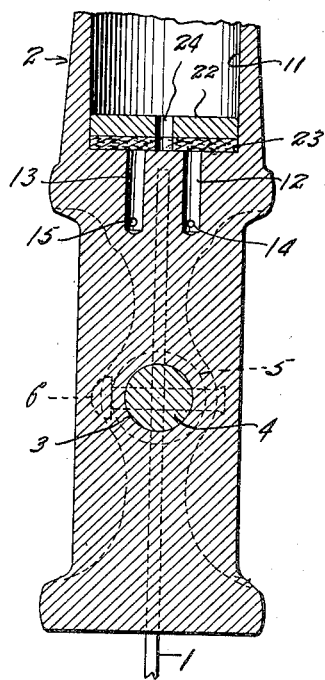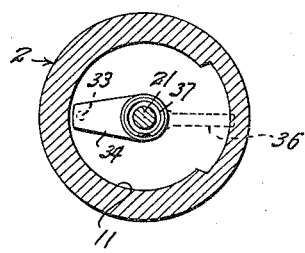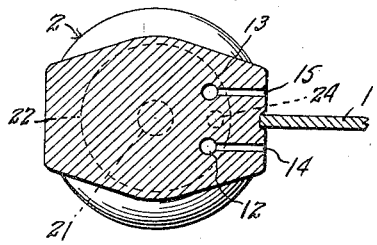

Patented Feb. 9, 1937

2,070,106

UNITED STATES PATENT OFFICE 2,070,106

GRAVITY FEED FOR CROSS-CUT SAW HANDLES

James N. Alexander, Birmingham, Ala.

Application December 27, 1934, Serial No. 759,390

5 Claims. (Cl. 145—35)

This invention relates to saws, and more particularly has reference to a handle therefor and means for lubricating a saw blade.

The common practice in heretofore oiling the blades of saws has necessitated the application of oil to the blade from an oil can or some other suitable receptacle. While attempts have been made to provide automatic means for oiling saw blades, these, in general, have been unsatisfactory.

An object of this invention is to provide means for applying oil to a saw blade.

Yet another object of my invention is to provide oiling means for a saw blade located in a saw handle and adapted to operate by gravity.

A still further object of my invention is to provide means to selectively oil one or the other surfaces of a saw blade.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Fig. 1 is an end view of a double handle saw equipped with my invention;

Fig. 2 is a top plan view of the same with a portion of the blade and the opposite handle omitted;

Fig. 3 is a sectional view along the line 3—3 of Fig. 1, looking in the direction of the arrows;

Fig. 4 is a view along the line 4—4 of Fig. 1, looking in the direction of the arrows;

Fig. 5 is a view along the line 5—5 of Fig. 4, looking in the direction of the arrows;

Fig. 6 is a view along the line 6—6 of Fig. 1, looking in the direction of the arrows;

Fig. 7 is a view along the line 7—7 of Fig. 1, looking in the direction of the arrows;

Fig. 8 is a view along the line 8—8 of Fig. 1, looking in the direction of the arrows.

As best shown in Figures 1 and 3, my invention comprises a saw blade 1 which may be of the cross-cut type, to which is secured at its opposite ends two handles designated generally 2. The handles 2 may be composed of any suitable material, but for reasons which will be apparent hereinafter, I prefer that they be constructed of some relatively lightweight metal.

Any conventional means of joining the handles to the blade may be employed, and in the drawings I have shown the handle drilled horizontally with a hole 3 which is adapted to receive a bolt 4. A slotted lug 5 is formed at one end of the bolt, and the blade 1 is adapted to extend into the slot thereof. The lug 5 is drilled to receive a rivet 6 or other fastening means, which also passes through an aperture 7 in the blade.

The handle may be recessed, as indicated by the dotted lines 8 of Fig. 3, to form a seat for the end of the saw blade. A wing nut 9 may be threaded on the bolt 4 to draw and maintain the saw blade 1 in a firmly nested position with respect to the handle.

The upper portion of the handle may be drilled longitudinally to form an oil reservoir 11. Channels 12 and 13 extend downwardly from reservoir 11 on opposite sides of the blade 1, as best shown in Fig. 5. Ducts 14 and 15 extend from the base of the channels 12 and 13, respectively, to the face of the saw handle and to a point adjacent the surfaces of the blade, as best shown in Fig. 6. Oil may therefore flow by gravity from the reservoir 11 onto one or the other surfaces of the blade 1.

The upper end of the handle is threaded as at 16 upon which is screwed a cap 17 to effectively close the reservoir. A washer 18 may be employed if desired.

Journalled centrally in the cap 17 is a reduced extension 19 of a shaft 21. At the lower end of the shaft 21 I provide a piston-like member 22 which forms a close fit with the walls of reservoir 11. A suitable washer 23 may be secured to the under surface of the piston member 22, and an aperture 24 is drilled through the piston and washer. Upon rotation of shaft 21 the aperture 24 is adapted to register with channel 12 or 13, or to be positioned at a point where it registers with neither one of said channels, as shown in Fig. 5.

As an aid in determining the location of the aperture 24 a finger 25 is mounted on the reduced extension 19. As best shown in Fig. 7, the finger 25 may be secured to the reduced extension 19 by means of a pin 26. The finger extends into a recessed portion 27 of the reservoir 11 which serves as a guide for the finger and limits the rotation of shaft 21.

When the finger 25 rests at one end of the recessed portion 27, the aperture 24 registers with one of the channels 12 or 13, and when the finger rests at the opposite end, the aperture registers with the other channel.

As best shown in Figs. 3 and 7, the finger 25 is drilled as at 28, the free end of said drilled aperture being burred to form a socket for a ball 29. A spring 31 is inserted in the channel to urge the ball in a seated position in the socket. A depression 32 is formed in the recessed portion 27 and when the ball rests in this socket, the aperture 24 is in inoperative position out of registry with either of the channels 12 or 13.

A breather hole 33 is drilled in the cap which, when the aperture 24 is in registry with one of the channels 12 or 13, admits air to the reservoir and thereby permits the outflow of oil by gravity. However, when the aperture 24 is in inoperative position, the breather 33 is closed by a finger 34 and washer 35 keyed to the reduced extension 19, below the cap 17. A key 36 is secured to the reduced extension above the cap 17, and, not only facilitates rotation of the shaft 21 but also prevents any axial movement of the shaft with respect to the cap.

It will also be noted that I provide a helical spring 37 which abuts against the underside of finger 34 and upon the upper side of finger 25 to maintain the finger 34 and packing 35 firmly against the nut 17.

The operation of my device is believed to be obvious from the foregoing. Initially oil is placed in the reservoir 11 by removing the cap 17 and filling the reservoir to the desired extent. The shaft 21 with its associated mechanism may be either completely removed or merely raised within the reservoir. In practice, I prefer the latter method.

The cap 17 may then be screwed onto the handle, and the key 36 turned until ball 29 rests in the depression 32. At this point the aperture 24 is out of registry with either of the channels 12 or 13 and the breather 33 is closed by the finger 34 and washer 35.

When it is desired to oil the blade of the saw, the blade may be either slightly inclined to the vertical or may be actually turned to the horizontal, provided there is sufficient oil in the reservoir 11. The key 36 is then turned so that the aperture 24 registers with the channel 12 or 13 that is above the blade, and at the same time the breather 33 is opened to the atmosphere. Consequently, oil will flow from the reservoir 11 through channel 12 or 13 and duct 14 or 15, respectively, onto the upper surface of the blade. During this time, the opposite channel and duct (that is, the one below the blade) will, of course, be closed, and therefore there is no danger of the oil from such channel dripping onto the ground.

The opposite side of the blade is then oiled in a similar manner by opening the opposite duct.

When this oiling is completed the key 36 is turned so that the ball 29 rests in the depression 32 to thereby close both channels 12 and 13. It will also be noted that in this position the breather 33 is likewise closed and it is therefore impossible for any of the oil to escape through the breather in the event the saw should be turned upside down.

While I have shown and disclosed my invention as applied to only one of the handles of the saw, it will, of course, be appreciated that the opposite handle may be likewise equipped.

The advantages of my invention are believed to be apparent. In the first place, my device obviates the necessity of carrying an oil can or other receptacle along with the saw. Also, it will be noted that the device permits an expeditious and efficient oiling of the saw blade. Furthermore, it will be noted that it is not necessary to substantially modify the construction of the saw, and in any event, the exterior shape and size of the handle remains the same as formerly.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A saw comprising a blade, a handle therefor, a reservoir for a lubricant within the handle, a channel extending from the base of the reservoir to the face of the handle adjacent one side of the blade, another channel extending from the base of the reservoir to the opposite side of the blade, means for selectively placing the channels in communication with the reservoir or for closing both of said channels, a breather aperture at the top of the reservoir, and means cooperating with said first mentioned means for closing said breather aperture when neither of the channels is in communication with the reservoir and opening the breather aperture when either is in communication therewith.

2. A saw comprising a blade, a handle therefor, a reservoir in the handle, channels leading from the base of the reservoir to points adjacent the opposite sides of the blade, a rotatable disk in the base of the reservoir and provided with an aperture adapted to register with the channels, a shaft for rotating the disk, means associated with the shaft for limiting the amount of rotation thereof, to align the aperture with either of the channels, spring means to hold the disc against the base of the reservoir, and breather means permitting ingress of air to the reservoir only when a channel is open to permit flow of oil to the blade.

3. A saw comprising a blade, a handle therefor, a reservoir in the handle for containing a lubricant, means for selectively discharging by gravity the lubricant from the reservoir to one or the other surfaces of the blade, a breathing aperture at the top of the reservoir, and means for closing said aperture when the lubricant is not discharged upon the blade and for automatically opening the breather aperture when lubricant is being discharged on the blade.

4. A saw comprising a blade, a handle therefor, a reservoir in the handle, channels leading from the base of the reservoir to points adjacent the sides of the blade, a rotatable member in the base of the reservoir and provided with an aperture adapted to register with the channels, a shaft for rotating the rotatable member, means associated with the shaft to yieldingly hold it in such a position that communication between the reservoir and the blade is prevented, means associated with the shaft for limiting the amount of rotation thereof to align the aperture with either of the channels, and breather means permitting ingress of air to the reservoir only when a channel is open to permit flow of oil to the blade.

5. A saw comprising a blade, a handle therefor, a lubricant reservoir within the handle, channels extending from the base of the reservoir to points adjacent the opposite faces of the saw blade, a rotatable disc in the base of the reservoir mounted upon a shaft extending through the top of the reservoir, packing on the lower face of the disc, apertures in the disc and the packing adapted to selectively register with the channels, means to rotate the shaft, spring means to hold the disc against the base of the reservoir, and breather means permitting ingress of air to the reservoir only when a channel is open to permit flow of oil to the blade.

JAMES N. ALEXANDER.